No. 645,552. Patented Mar. 20, 1900.
W. COURTENAY.
COMBINED SLEEPER AND CONDUIT FOR ELECTRIC RAILWAYS.
(Application filed July 17, 1899.)
(No Model.)
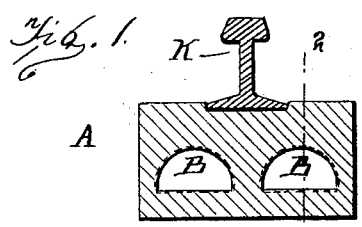
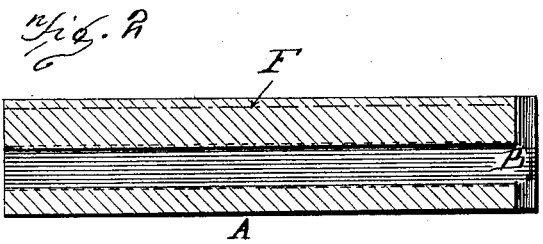
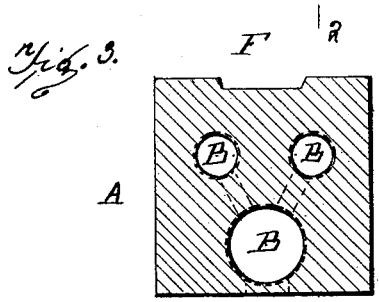
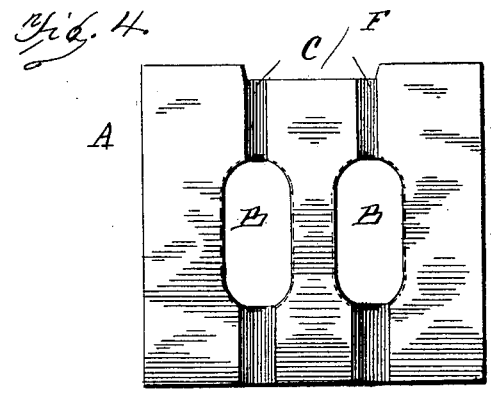
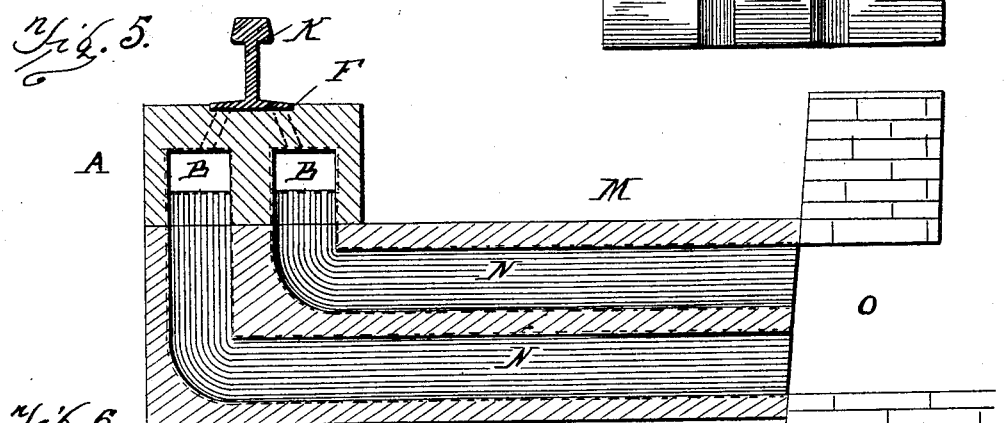
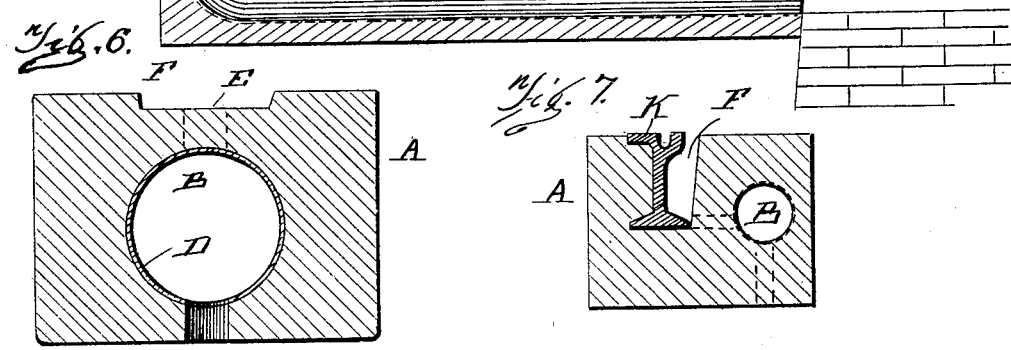
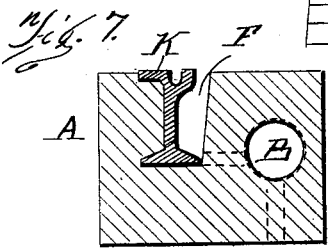
WITNESSES
Chas. K. Davies.
M. E. Brown
INVENTOR
Wm Courtenay
By W. A. Bartlett
Attorney

UNITED STATES PATENT OFFICE.

WILLIAM COURTENAY, OF NEW YORK, N. Y.

COMBINED SLEEPER AND CONDUIT FOR ELECTRIC RAILWAYS.

SPECIFICATION forming part of Letters Patent No. 645,552, dated March 20, 1900.

Application filed July 17, 1899. Serial No. 724,106. (No model.)

*To all whom it may concern:*

Be it known that I, WILLIAM COURTENAY, a citizen of the United States, residing at New York, in the county of New York and State of New York, have invented certain new and useful Improvements in Sleepers and Conduits for Electric Railways, of which the following is a specification, reference being had therein to the accompanying drawings.

This invention relates to a non-conducting railway-rail support and electrical-wire conduit.

The object of the invention is to produce a sleeper or rail-support of non-conducting material strong enough to act as a rail-base for an electrical-conductor rail, (either third rail or otherwise,) which material shall be a non-conductor of electricity and which sleeper shall contain a conduit or conduits through which electrical wires or cables may pass to act as conducting-wires to the rail or as return-wires or for other purposes, and the conduit or conduits in said sleepers shall be thoroughly insulated and smooth to permit of ready insertion or removal of wires.

In my Patent No. 608,756, of August 2, 1898, I describe an artificial stone or reconstructed granite which is made by calcining granite chips, pulverizing and sifting, then forming blocks of this pulverized granite, fire-clay, and feldspar, which blocks are faced with the same ingredients in different proportions and then burned at a very high temperature. Artificial or reconstructed granite made in this way is waterproof and fireproof and is an almost perfect non-conductor of electricity. The material for reconstructed granite described in my patent referred to is preferably the basic material from which the sleepers or rail-supports of my present invention are composed; but the proportions may be changed within reasonable limits, and the form of blocks will be according to the requirements of the case.

Figure 1 is a cross-section of one form of my sleeper with rail applied. Fig. 2 is a section of same on line 2 2. Fig. 3 is a section of another form of sleeper and conduit, and Fig. 4 an end view of a modification with up-and-down end passages. Fig. 5 is a section of sleeper, showing a form of connection to manhole. Fig. 6 is a section of conduit and glazing, the latter enlarged in its proportions. Fig. 7 is a sleeper-section for grooved rails.

I prepare the plastic material as described in the patent, and the same is molded into a sleeper or rail-support of suitable form, as indicated at A. Such sleeper has one or more longitudinal passages B B for the electrical-conductor wire. The passage or conduit may have end grooves, as C, or these grooves may be provided in a certain number of the sleeper-sections and not in others. The passages B and the grooves C are preferably coated with a thick glaze or layer of vitreous material D. The block is then burned as usual, and the passage will then have a vitreous lining or coating which is as smooth as glass usually is and forms an excellent surface along which wires may be drawn. The glass is of course a non-conductor of electricity; but the sleeper itself is a non-conductor, and the glass lining of the conduit is largely for the purpose of giving smoothness to the finish. The artificial stone is stronger than ordinary glass.

Instead of or in addition to the end passages or grooves C the sleeper-blocks may have perforations E, as indicated in dotted lines, these passages being formed in the plastic material before burning and being lined with glass or glaze.

The sleeper-sections may be made of any desirable length, about three feet being a convenient length. In cross-section the blocks are of such size as will give the required strength and rail-support. A groove F in the upper surface of the sleeper gives a firm basis-support for the base of the rail, and the groove will conform to the character of the rail employed.

The continuous feed-wire, either as a naked wire or as an insulated wire or cable, extends through the continuous conduit B, and branch feeders may extend from the same through grooves C or holes E to connect with rails K. A feed and a return wire may be used in sleepers having double conduits, the electrical connections to the rail-sections being made in any convenient way and being no part of my present invention.

In Fig. 5 I show one form of connection through block M, of material similar to the sleepers, by which wires may be led to the passages B from the manhole O.

As the reconstructed granite of my invention is much stronger than natural granite, is indestructible by frost, fire, or water, will withstand a crushing strain of several tons per square inch and a breaking strain of several hundred pounds per inch-section, it is strong enough to make a bed-support for most railways when properly tied in place.

In Fig. 7 I show a block with deep groove for grooved rail and conduits alongside. In such case the recess alongside the rail may be filled with grouting.

While my sleepers are specially intended as supports for the third rail of "third-rail" electric roads, they are by no means confined to such use, as has been explained.

As the material of which these sleepers is composed has already been patented to me, it is evident I do not herein claim such material. What I do desire to cover in the present application is the improvement involved in adapting blocks of this material to the uses of electrical railways for the purpose of forming both the electrical conduits and rail-supports.

What I claim is—

1. A rail-support or sleeper of composite stone which is a non-conductor of electricity, said sleeper having a longitudinal passage for wires, and a separate surface groove in which the rail rests, substantially as described.

2. A rail-support or sleeper of non-conducting composite stone, having a longitudinal groove for the base of the rail, a separate longitudinal passage for electrical wire, and side passages from such longitudinal passage.

3. A rail-support of non-conducting composite stone having a grooved surface to support the rail-base, and a longitudinal passage for wires, said passage having a vitreous lining, substantially as described.

4. A sleeper for electric railways having its body composed of artificial granite of the character described, having a longitudinal groove in its upper face for a rail-seat, and having a longitudinal passage through its body and lined or coated with glass, substantially as described.

In testimony whereof I affix my signature in presence of two witnesses.

WILLIAM COURTENAY.

Witnesses:
H. M. GRANT,
GEORGE L. COURTENAY.